United States Patent
Kowalkowski et al.

(10) Patent No.: US 9,003,778 B2
(45) Date of Patent: Apr. 14, 2015

(54) EXHAUST FLUID DOSING CONTROL SYSTEM AND METHOD

(71) Applicant: GM Global Technology Operations LLC, Detroit, MI (US)

(72) Inventors: Janean E. Kowalkowski, Northville, MI (US); Igor Anilovich, Walled Lake, MI (US); Robert J. Sutschek, South Lyon, MI (US); Jeffrey F. Loo, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 8 days.

(21) Appl. No.: 14/021,143

(22) Filed: Sep. 9, 2013

(65) Prior Publication Data
US 2015/0068196 A1    Mar. 12, 2015

(51) Int. Cl.
*F01N 3/00* (2006.01)
*F01N 3/20* (2006.01)
*B01D 53/94* (2006.01)

(52) U.S. Cl.
CPC ............ *F01N 3/208* (2013.01); *B01D 53/9431* (2013.01)

(58) Field of Classification Search
CPC ... F02D 41/029; F02D 41/0275; F01N 9/002; F01N 3/0842; F01N 3/035; F01N 3/0814; F01N 3/2066; F01N 13/035; F01N 13/02

USPC ................................ 60/274, 285, 295, 301
See application file for complete search history.

(56) References Cited

U.S. PATENT DOCUMENTS

| | | | | |
|---|---|---|---|---|
| 6,063,350 | A * | 5/2000 | Tarabulski et al. | 423/239.1 |
| 2008/0022658 | A1 * | 1/2008 | Viola et al. | 60/286 |
| 2008/0178575 | A1 * | 7/2008 | Shaikh et al. | 60/274 |
| 2008/0178656 | A1 * | 7/2008 | Nieuwstadt et al. | 73/23.31 |
| 2009/0185954 | A1 * | 7/2009 | Qi et al. | 422/62 |
| 2010/0205940 | A1 * | 8/2010 | Toshioka et al. | 60/276 |
| 2011/0192149 | A1 * | 8/2011 | Yasui | 60/287 |
| 2012/0304744 | A1 * | 12/2012 | Takahashi et al. | 73/61.43 |
| 2013/0098460 | A1 * | 4/2013 | Elong et al. | 137/2 |
| 2013/0283769 | A1 * | 10/2013 | Watanabe et al. | 60/274 |
| 2013/0291617 | A1 * | 11/2013 | Boudaoud et al. | 73/1.02 |

* cited by examiner

*Primary Examiner* — Jason Shanske
*Assistant Examiner* — Patrick Maines
(74) *Attorney, Agent, or Firm* — Cantor Colburn LLP

(57) ABSTRACT

A dosing control system for an exhaust system includes: a reductant fluid tank operable to contain a reductant solution comprising urea; an injector disposed in operable communication between a reductant tank and an SCR apparatus, the injector being operable to inject the reductant solution from the reductant tank into a flow of exhaust upstream of the SCR apparatus; a urea quality sensor (UQS) configured and disposed to sense a concentration of the urea in the reductant solution; and, a control module disposed in signal communication with the UQS and in operable communication with the injector, the control module being operable to adjust a dosing of the reductant solution injected by the injector based on a concentration of the urea in the reductant solution.

18 Claims, 1 Drawing Sheet

EXHAUST FLUID DOSING CONTROL SYSTEM AND METHOD

FIELD OF THE INVENTION

The subject invention relates to internal combustion engines, and more particularly to the use of exhaust fluid reductant for reducing nitrogen oxides (NOx) emissions in the exhaust of such engines.

BACKGROUND

An example reductant is an aqueous urea solution optimally blended with 32.5% urea and 67.5% deionized water, and is used in selective catalytic reduction (SCR) exhaust systems to lower NOx exhaust emissions. If the reductant solution becomes diluted from the optimal mixture, the tailpipe NOx emissions will increase. Accordingly, the art of controlling NOx emissions in the exhaust of internal combustion engines will be improved by providing a control system that can adjust the dosing of the reductant if it becomes diluted.

SUMMARY OF THE INVENTION

In one exemplary embodiment of the invention, a dosing control system for an exhaust system is provided, where the exhaust system includes an exhaust flow port configured and disposed to receive exhaust flow from an internal combustion engine, and a selective catalytic reduction (SCR) apparatus assembly disposed in downstream flow communication with the exhaust flow port. The dosing control system includes: a reductant fluid tank operable to contain a reductant solution comprising urea; an injector disposed in operable communication between the reductant tank and the SCR apparatus, the injector being operable to inject the reductant solution from the reductant tank into a flow of exhaust upstream of the SCR apparatus; a urea quality sensor (UQS) configured and disposed to sense a concentration of the urea in the reductant solution; and, a control module disposed in signal communication with the UQS and in operable communication with the injector, the control module being operable to adjust a dosing of the reductant solution injected by the injector based on a concentration of the urea in the reductant solution.

In another exemplary embodiment of the invention, a method for delivering an exhaust fluid reductant solution to an exhaust flow upstream of a selective catalytic reduction (SCR) apparatus is provided. The method includes: monitoring a concentration percentage of urea in the reductant solution disposed in a reductant container or inline between the reductant container and a reductant solution injector; based on the monitored concentration of urea in the reductant solution, adjusting a dosing of the reductant solution to be injected into the exhaust flow upstream of the SCR apparatus; and injecting the adjusted dosing of the reductant solution into the exhaust flow upstream of the SCR apparatus.

In another exemplary embodiment of the invention, a vehicle includes: an internal combustion engine; an exhaust system; and, a dosing control system. The exhaust system includes: an exhaust flow port configured and disposed to receive exhaust flow from the engine; and, a selective catalytic reduction (SCR) apparatus disposed in downstream flow communication with the exhaust flow port. The dosing control system includes: a reductant tank operable to contain a reductant solution comprising urea; an injector disposed in operable communication between the reductant tank and the SCR apparatus, the injector being operable to inject the reductant solution from the reductant tank into a flow of exhaust upstream of the SCR apparatus; a urea quality sensor (UQS) configured and disposed to sense a concentration of the urea in the reductant solution; and a control module disposed in signal communication with the UQS and in operable communication with the injector, the control module being operable to adjust a dosing of the reductant solution injected by the injector based on a concentration of the urea in the reductant solution.

In another exemplary embodiment of the invention, a non-road or stationary device includes: an internal combustion engine; an exhaust system; and, a dosing control system. The exhaust system includes: an exhaust flow port configured and disposed to receive exhaust flow from the engine; and, a selective catalytic reduction (SCR) apparatus disposed in downstream flow communication with the exhaust flow port. The dosing control system includes: a reductant tank operable to contain a reductant solution comprising urea; an injector disposed in operable communication between the reductant tank and the SCR apparatus, the injector being operable to inject the reductant solution from the reductant tank into a flow of exhaust upstream of the SCR apparatus; a urea quality sensor (UQS) configured and disposed to sense a concentration of the urea in the reductant solution; and, a control module disposed in signal communication with the UQS and in operable communication with the injector, the control module being operable to adjust a dosing of the reductant solution injected by the injector based on a concentration of the urea in the reductant solution.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
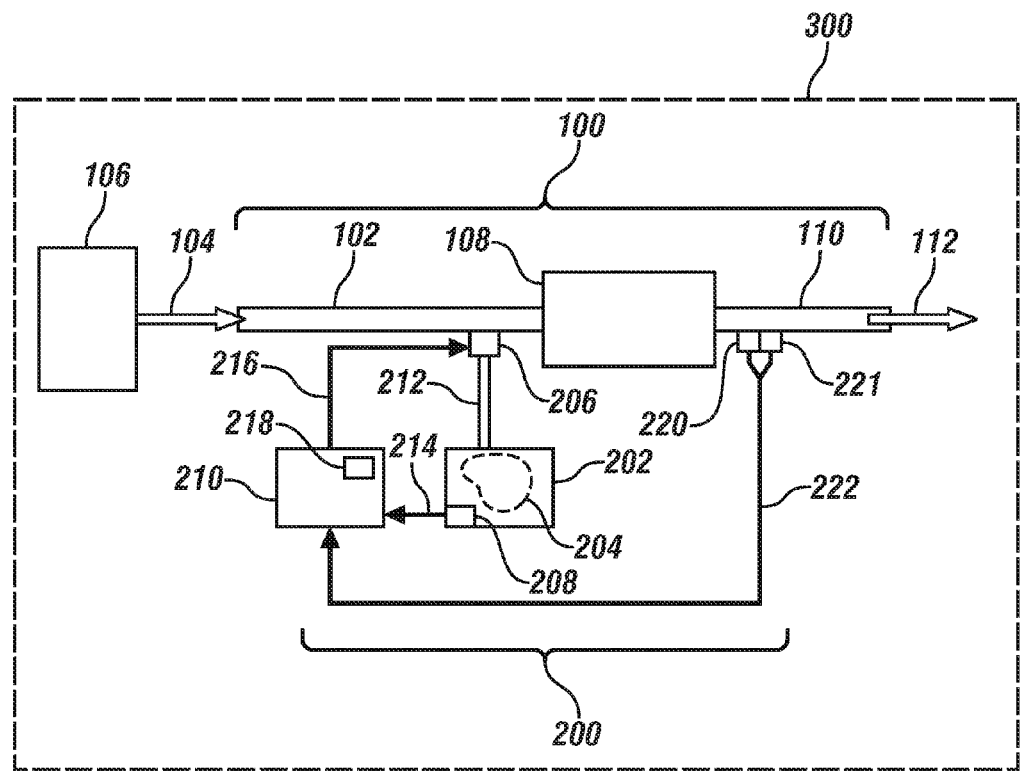
FIG. 1 depicts a block diagram schematic of an exhaust fluid dosing control system in accordance with an embodiment of the invention.

The following description is merely exemplary in nature and is not intended to limit the present disclosure, its application or uses. It should be understood that throughout the drawings, corresponding reference numerals indicate like or corresponding parts and features.

As used herein, the term vehicle is not limited to just an automobile, truck, van or sport utility vehicle, but includes any self-propelled or towed conveyance suitable for transporting a burden, or any stationary or non-road engine equipment.

In an embodiment, the term "engine" as used herein refers to any internal combustion engine capable of producing oxides of nitrogen. In an embodiment, the term "engine" refers to a diesel engine. In another embodiment, the term "engine" refers to a spark-ignition engine fueled by diesel fuel or any other suitable combustive liquid or gaseous fuels.

In accordance with an exemplary embodiment of the invention, and with reference to FIG. 1, a dosing control system 200 for a portion of an exhaust system 100 of a vehicle 300 is depicted. The exhaust system 100 includes an exhaust flow port 102 configured and disposed to receive exhaust flow 104 from an engine 106 or exhaust manifold thereof, and a SCR apparatus 108 disposed in downstream flow communication with the exhaust flow port 102. A downstream exhaust flow port 110, which may be in the form of an exhaust pipe or tailpipe, serves to deliver the downstream exhaust flow 112 to ambient. The dosing control system 200 includes a reductant tank 202 operable to contain a reductant solution 204 containing urea. As mentioned above, the reductant solution 204 is an aqueous urea solution optimally blended with 32.5% urea and 67.5% deionized water. The reductant solution 204 is used in an SCR apparatus 108 to lower the concentration of NOx in the exhaust emissions of internal combustion engines. The dosing control system 200 further includes an injector 206, a UQS (Urea Quality Sensor) 208, which may be disposed in the reductant tank 202 or disposed inline with the reductant tank 202 prior to the injector 206, and a control module 210. The injector 206 is disposed in operable communication between the reductant tank 202 and the SCR apparatus 108 via a flow port 212. The injector 206 is operable to receive the reductant solution 204 from the reductant tank 202 via the flow port 212, and inject the reductant solution 204 into the exhaust flow port 102 upstream of the SCR apparatus 108. The UQS 208 is configured and disposed to sense a concentration of the urea in the reductant solution 204. A nominal range for the concentration of urea is from about 31.8% to about 33.2% by volume, which is alternatively referred to as 32.5%+/−0.7%. As used herein, the term "about" refers to a range that may vary slightly from the +/−0.7% tolerance about a nominal concentration of 32.5% depending on industry standard accepted practices. A UQS 208 suitable for a purpose disclosed herein is available from WEMA USA, Inc., Schrader International, Inc., SSI Technologies, Inc., Measurement Specialties, Continental, or Sun-A Corp, for example, and operates in a manner known in the art of such sensors. The control module 210 is disposed in signal communication with the UQS 208 via signal line 214, and in operable communication with the injector 206 via control line 216. The control module 210 is operable to adjust a dosing of the reductant solution 204 injected by the injector 206 based on a concentration of the urea in the reductant solution 204, which will be discussed in more detail below.

In an embodiment the control module 210 includes a processing circuit 218 responsive to executable instructions which when executed by the processing circuit 218 facilitates an upward adjustment of the dosing of the reductant solution 204 in response to a downward change in the concentration of the urea in the reductant solution 204 as sensed by the UQS 208 and communicated to the control module 210 via the signal line 214. Such a downward change in the concentration of the urea in the reductant solution 204 may occur if an operator of the vehicle 300 in an emergency situation adds water or other solution (generally referred to as a dilutant) to the reductant tank 202 in order to keep the vehicle 300 operational when the quantity of reductant solution 204 in the reductant tank 202 is low and replacement reductant solution 204 is not readily available. In such a situation, an upward adjustment of the dosing of the reductant solution 204 injected into the exhaust flow upstream of the SCR apparatus 108 serves to maintain control of NOx emissions when the reductant solution 204 has been diluted. In an embodiment the processing circuit 218 is responsive to executable instructions to upwardly adjust the dosing of the reductant solution 204 in response to the concentration of the urea in the reductant solution 204 falling below about 31.8% by volume.

Once the aforementioned emergency situation has passed and the operator of the vehicle 300 has purged the reductant tank 202 of water or other dilutant, and has procured and replenished the reductant tank 202 with a properly specified reductant solution 204, an embodiment also includes an arrangement where the processing circuit 218 is responsive to executable instructions to downwardly adjust the dosing of the reductant solution 204 in response to the concentration of the urea in the reductant solution 204 being elevated from a level below the aforementioned defined concentration range of 32.5%+/−0.7% (indicative of a diluted solution), to a level within the defined concentration range (indicative of a nondiluted solution).

In an embodiment, the UQS 208 is configured to sense the concentration of urea in the reductant solution 204 at a first defined rate, such as 1 Hz for example, and the processing circuit 218 is responsive to executable instructions to adjust the dosing of the reductant solution 204 at a second defined rate slower than the first defined rate, such as once per minute for example. Since the concentration of urea in the reductant solution 204 would not be expected to change quickly in the ordinary course of operating the vehicle 300, it should not be necessary to perform a dosing adjustment as frequently as the UQS 208 is capable of sensing the urea concentration. Hence, the processing circuit 218 can be programmed accordingly. While specific rates are provided herein, it will be appreciated that recitation of such rates is merely for illustration purposes only, and that the scope of the invention is not so limited. It will also be appreciated that the scope of the invention is not limited to the aforementioned first and second defined rates being different, as it is contemplated that the UQS 208 could be programmed, adjusted or configured to operate at a rate that is compatible with the rate at which the dosing of the reductant solution 204 is to be adjusted.

In an embodiment the dosing control system 200 further may include a NOx sensor 220 disposed downstream of the SCR apparatus 108 that is configured to monitor a level of NOx emission in the exhaust flow in the downstream exhaust flow port 110. The NOx sensor 220 communicates the level of NOx emission to the control module 210 via signal line 222, and from such information the control module 210, via the processing circuit 218 or other suitable means, determines a nominal dosing of the reductant solution 204 to be injected into the exhaust flow upstream of the SCR apparatus 108 to provide the desired level of control for NOx reduction. In response to the UQS 208 sensing a diluted reductant solution 204, the processing circuit 218 would facilitate an upward adjustment of the dosing of the reductant solution 204, as discussed above, which in an embodiment is accomplished by adjusting the nominal dosing to establish a modified dosing, and then injecting the modified dosing of the reductant solution 204 into the exhaust flow upstream of the SCR apparatus 108. In an embodiment, the processing circuit 218 is responsive to executable instructions to adjust the dosing of the reductant solution 204 from the nominal dosing to the modified dosing by utilizing a look up table, a mathematical function, a multiplier, or any other means for changing a nominal value into a modified value suitable for a purpose disclosed herein.

In an embodiment the dosing control system 200 further may include an ammonia, NH3 (alternatively $NH_3$), sensor 221 disposed downstream of the SCR apparatus 108 that is configured to monitor a level of NH3 emission (typically referred to as "slip") in the exhaust flow in the downstream exhaust flow port 110. The NH3 sensor 221 communicates the level of NH3 emission to the control module 210 via signal line 222, and from such information the control module 210, via the processing circuit 218 or other suitable means, determines a nominal dosing of the reductant solution 204 to be injected into the exhaust flow upstream of the SCR apparatus 108 to provide the desired level of control for NOx reduction while mitigating NH3 slip. In response to the UQS 208 sensing a diluted reductant solution 204, the processing circuit 218 would facilitate an upward adjustment of the dosing of the reductant solution 204, as discussed above, which in an embodiment is accomplished by adjusting the nominal dosing to establish a modified dosing, and then injecting the modified dosing of the reductant solution 204 into the exhaust flow upstream of the SCR apparatus 108. In an embodiment, the processing circuit 218 is responsive to executable instructions to adjust the dosing of the reductant solution 204 from the nominal dosing to the modified dosing by utilizing a look up table, a mathematical function, a multiplier, or any other means for changing a nominal value into a modified value suitable for a purpose disclosed herein.

When the control module 210 is operational, such as during operation of the vehicle 300 for example, an embodiment includes the control module 210 configured to facilitate continuous adjustment of the dosing of the reductant solution 204 in response to a change in the concentration of the urea in the reductant solution 204 via continuous feedback from the UQS 208 to the control module 210. Another or a same embodiment includes the control module 210 configured to facilitate adjustment of the dosing of the reductant solution 204 upon initial activation of the dosing control system 200, such as would occur during ignition startup of the vehicle 300 for example.

Figure 2:
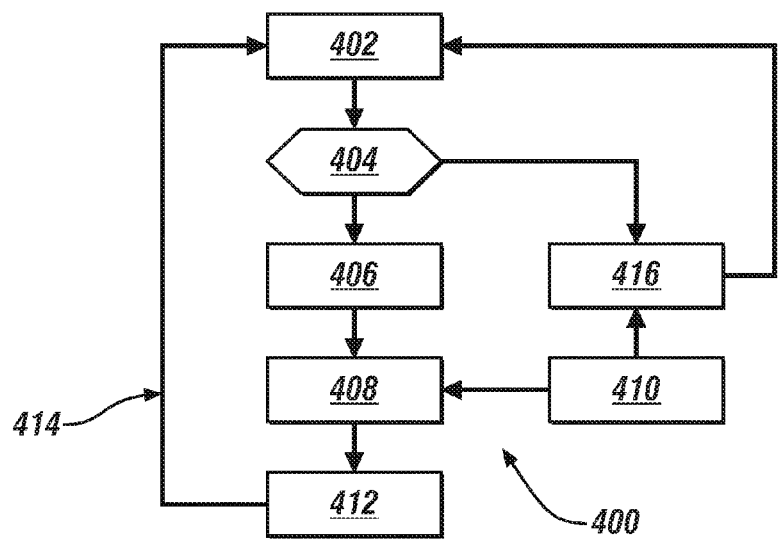
FIG. 2 depicts a flowchart of a method of dosing and delivering an exhaust fluid solution in accordance with an embodiment of the invention.

In view of the foregoing description, it will be appreciated that an embodiment of the invention also includes a method 400, performed via executable instructions executed by processing circuit 218 for example, for delivering a reductant solution 204 to an exhaust flow 104 upstream of a SCR apparatus 108, which will now be discussed with reference to FIG. 2 in combination with FIG. 1.

In an embodiment, method 400 is a closed loop process that begins at logic block 402 where the UQS 208 senses the urea concentration percentage by volume in the reductant solution 204 in the reductant tank 202. Control logic then passes to logic block 404.

At logic block 404, if the urea concentration is less than a defined amount, such as 31.8% for example (32.5% minus 0.7%), then control logic passes to logic block 406.

At logic block 406 the dosing of the reductant solution 204 is incrementally increased via a dosing compensation factor according to one of the methods discussed herein to compensate for the diluted quality of the reductant solution 204. Control logic then passes to logic block 408.

At logic block 408 a calculation is performed to determine a new modified dosing of the reductant solution 204, which is based on the incremental increase determined from block 406 and a nominal reductant dosing amount provided from logic block 410, where the nominal reductant dosing quantity is verified as being an under-dosed or over-dosing condition by either or both of sensors 220, 221. In an embodiment, the NOx sensor 220 and NH3 sensor 221 may be embodied in the same sensor. In an embodiment, the modified dosing level is the product of the dosing compensation factor from logic block 406 and the nominal dosing level from block 410. Control logic then passes to logic block 412.

At logic block 412, control module 210 facilitates actuation of the injector 206 to inject the modified dosing level of reductant solution 204 into the exhaust flow 104 upstream of the SCR apparatus 108. Control logic then passes back to logic block 402 via logic path 414 to repeat the method 400.

Referring back to logic block 404, if the urea concentration is not less than a defined amount, such as 31.8% for example (32.5% minus 0.7%), then control logic passes to logic block 416.

At logic block 416, control module 210 facilitates actuation of the injector 206 to inject the original dosing level of reductant solution 204 into the exhaust flow 104 upstream of the SCR apparatus 108, that is, the control module facilitates actuation of the injector 206 to inject the nominal reductant dosing amount provided from logic block 410. While there may be other modifiers to the reductant dosing quantity, the modified contribution due to the UQS 208 would be negated if the urea concentration was detected to be within the nominal range. Control logic then passes back to logic block 402 via logic path 414 to repeat the method 400.

Stated alternatively, the method 400 includes monitoring a concentration percentage of urea in the reductant solution (disposed in a reductant container or in the reductant line 212) (logic block 402); based on the monitored concentration of urea in the reductant solution 204, adjusting a dosing of the reductant solution 204 to be injected into the exhaust flow upstream of the SCR apparatus (logic blocks 406, 408, 410); and, injecting the adjusted dosing of the reductant solution 204 into the exhaust flow upstream of the SCR apparatus (logic block 412). In an embodiment, the step of adjusting the dosing of the reductant solution 204 to be injected involves upwardly adjusting the dosing of the reductant solution 204 in response to a downward change in the concentration of the urea in the reductant solution 204, wherein upwardly adjusting the dosing of the reductant solution 204 is in response to the concentration of the urea in the reductant solution 204 falling below about 31.8% by volume (logic block 404). In an embodiment, the step of monitoring the concentration percentage of urea in the reductant solution 204 involves monitoring the concentration percentage at a defined rate (incorporated into the step at logic block 402), and adjusting the dosing of the reductant solution 204 to be injected comprising adjusting the dosing at a different rate slower than the defined rate (incorporated into the step at logic block 412). In an embodiment, the step of adjusting the dosing of the reductant solution 204 to be injected involves adjusting the dosing of the reductant solution 204 according to at least one of: a look up table; a mathematical function; or, a multiplier (logic block 406). In an embodiment, method 400 also includes downwardly adjusting the dosing of the reductant solution 204 in response to the concentration of the urea in the reductant solution 204 being elevated from a level below a defined concentration range to a level within the defined concentration range, where the defined concentration range is from about 31.8% to about 33.2% by volume (incorporated into the step at logic block 416). In an embodiment, and in response to a downward change in the concentration of the urea in the reductant solution 204, upwardly adjusting the dosing of the reductant solution 204 (logic blocks 404, 406, 408, 410); and in response to an upward change in the concentration of the urea in the reductant solution 204, downwardly adjusting the dosing of the reductant solution 204 (incorporated into the step at logic block 416); and in response to an absence of change in the concentration of the urea in the reductant solution 204, performing no additional adjustment in the dosing of the reductant solution 204 (incorporated into the step at logic block 416).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A dosing control system for an exhaust system, the exhaust system having an exhaust flow port configured and disposed to receive exhaust flow from an internal combustion engine, and a selective catalytic reduction (SCR) apparatus disposed in downstream flow communication with the exhaust flow port, the dosing control system comprising:
a reductant fluid tank operable to contain a reductant solution comprising urea;
an injector disposed in operable communication between the reductant tank and the SCR apparatus, the injector being operable to inject the reductant solution from the reductant tank into a flow of exhaust upstream of the SCR apparatus;
a urea quality sensor (UQS) configured and disposed to sense a concentration of urea in the reductant solution;
a control module disposed in signal communication with the UQS and in operable communication with the injector, the control module comprising a processing circuit responsive to executable instructions to adjust a dosing of the reductant solution injected by the injector based on a concentration of urea in the reductant solution; and
wherein the processing circuit is further responsive to executable instructions which when executed by the processing circuit facilitates an upward adjustment of the dosing of the reductant solution in response to a downward change in the concentration of urea in the reductant solution.

2. The dosing control system of claim 1, wherein the processing circuit is further responsive to executable instructions to adjust the dosing of the reductant solution at a slower rate than the UQS is configured to sense the concentration of urea in the reductant solution.

3. The dosing control system of claim 1, wherein the processing circuit is further responsive to executable instructions to adjust the dosing of the reductant solution according to at least one of: a look up table; a mathematical function; and, a multiplier.

4. The dosing control system of claim 1, wherein the processing circuit is further responsive to executable instructions to upwardly adjust the dosing of the reductant solution in response to the concentration of urea in the reductant solution falling below about 31.8% by volume.

5. The dosing control system of claim 1, wherein the processing circuit is further responsive to executable instructions to downwardly adjust the dosing of the reductant solution in response to the concentration of urea in the reductant solution being elevated from a level below a defined concentration range to a level within the defined concentration range.

6. The dosing control system of claim 5, wherein the defined concentration range is from about 31.8% to about 33.2% by volume.

7. The dosing control system of claim 1, wherein the control module when operational is configured to facilitate a continuous adjustment of the dosing of the reductant solution in response to a change in the concentration of urea in the reductant solution via continuous feedback from the UQS to the control module.

8. The dosing control system of claim 1, wherein the control module is configured to facilitate adjustment of the dosing of the reductant solution upon an initial activation of the control system.

9. A method for delivering an exhaust fluid reductant solution to an exhaust flow upstream of a selective catalytic reduction (SCR) apparatus, the method comprising:
monitoring a concentration percentage of urea in the reductant solution disposed in a reductant container or inline between the reductant container and a reductant solution injector;
based on the monitored concentration percentage of urea in the reductant solution, adjusting a dosing of the reductant solution to be injected into the exhaust flow upstream of the SCR apparatus;
injecting the adjusted dosing of the reductant solution into the exhaust flow upstream of the SCR apparatus;
monitoring a level of NOx or NH3 emission in the exhaust flow downstream of the SCR apparatus and verifying from the monitored level of NOx or NH3 emissions an appropriate dosing of the reductant solution into the exhaust flow upstream of the SCR apparatus;
wherein the adjusting the dosing of the reductant solution to be injected comprises adjusting the nominal dosing to establish a quality sensed modified dosing; and
wherein the injecting the adjusted dosing comprises injecting the quality sensed modified dosing.

10. The method of claim 9, wherein the adjusting the dosing of the reductant solution to be injected comprises upwardly adjusting the dosing of the reductant solution in response to a downward change in the concentration of the urea in the reductant solution.

11. The method of claim 9, wherein the monitoring the concentration percentage of urea in the reductant solution comprises monitoring the concentration percentage at a defined rate, and the adjusting the dosing of the reductant solution to be injected comprising adjusting the dosing at a different rate slower than the defined rate.

12. The method of claim 9, wherein the adjusting the dosing of the reductant solution to be injected comprises adjusting the dosing of the reductant solution according to at least one of: a look up table; a mathematical function; and, a multiplier.

13. The method of claim 10, wherein upwardly adjusting the dosing of the reductant solution is in response to the concentration percentage of the urea in the reductant solution falling below about 31.8% by volume.

14. The method of claim 10, further comprising downwardly adjusting the dosing of the reductant solution in response to the concentration of the urea in the reductant solution being elevated from a level below a defined concentration range to a level within the defined concentration range.

15. The method of claim 14, wherein the defined concentration range is from about 31.8% to about 33.2% by volume.

16. The method of claim 9, wherein:
in response to a downward change in the concentration of urea in the reductant solution, upwardly adjusting the dosing of the reductant solution;
in response to an upward change in the concentration of urea in the reductant solution, downwardly adjusting the dosing of the reductant solution; and
in response to an absence of change in the concentration of urea in the reductant solution, performing no adjustment in the dosing of the reductant solution.

17. A vehicle, comprising:
an internal combustion engine;

an exhaust system comprising an exhaust flow port configured and disposed to receive exhaust flow from the engine, and a selective catalytic reduction (SCR) apparatus disposed in downstream flow communication with the exhaust flow port; and a dosing control system comprising:
- a reductant tank operable to contain a reductant solution comprising urea;
- an injector disposed in operable communication between the reductant tank and the SCR apparatus, the injector being operable to inject the reductant solution from the reductant tank into a flow of exhaust upstream of the SCR apparatus;
- a urea quality sensor (UQS) configured and disposed to sense a concentration of urea in the reductant solution;
- a control module disposed in signal communication with the UQS and in operable communication with the injector, the control module comprising a processing circuit responsive to executable instructions to adjust a dosing of the reductant solution injected by the injector based on a concentration of urea in the reductant solution; and
- wherein the processing circuit is further responsive to executable instructions which when executed by the processing circuit facilitates an upward adjustment of the dosing of the reductant solution in response to a downward change in the concentration of urea in the reductant solution.

18. A non-road or stationary device, comprising:
an internal combustion engine;
an exhaust system comprising an exhaust flow port configured and disposed to receive exhaust flow from the engine, and a selective catalytic reduction (SCR) apparatus disposed in downstream flow communication with the exhaust flow port; and a dosing control system comprising:
- a reductant tank operable to contain a reductant solution comprising urea;
- an injector disposed in operable communication between the reductant tank and the SCR apparatus, the injector being operable to inject the reductant solution from the reductant tank into a flow of exhaust upstream of the SCR apparatus;
- a urea quality sensor (UQS) configured and disposed to sense a concentration of urea in the reductant solution;
- a control module disposed in signal communication with the UQS and in operable communication with the injector, the control module comprising a processing circuit responsive to executable instructions to adjust a dosing of the reductant solution injected by the injector based on a concentration of urea in the reductant solution; and
- wherein the processing circuit is further responsive to executable instructions which when executed by the processing circuit facilitates an upward adjustment of the dosing of the reductant solution in response to a downward change in the concentration of urea in the reductant solution.

* * * * *